(No Model.)

C. D. ELDER.
Apparatus for Cooling Milk.

No. 237,261.             Patented Feb. 1, 1881.

Attest;
F. W. Howard
F. H. Hall

Inventor;
Cornelius D. Elder,
by Dyer & Wilber
att'ys.

UNITED STATES PATENT OFFICE.

CORNELIUS D. ELDER, OF MANCHESTER, IOWA.

APPARATUS FOR COOLING MILK.

SPECIFICATION forming part of Letters Patent No. 237,261, dated February 1, 1881.

Application filed September 6, 1880. (No model.)

*To all whom it may concern:*

Be it known that I, CORNELIUS D. ELDER, of Manchester, in the county of Delaware and State of Iowa, have invented a new and useful Improvement in Apparatus for Cooling Milk; and I do hereby declare that the following is a full and exact description of the same, reference being had to the accompanying drawings, and to the letters of reference marked thereon.

The ordinary method of raising cream on milk heretofore has been to remove the animal heat from the milk by placing the receptacle containing it in water of a temperature considerably below that of the surrounding atmosphere, or by allowing the water to pass under or around said receptacle. By cooling the milk in this manner its lower portion necessarily becomes the coldest, while that portion at or near its upper surface, and where the cream collects, still remains warm and tepid, seldom getting below the normal temperature of the surrounding air, and often when a deep receptacle is used the milk at the bottom remains sweet, or nearly so, while that portion at the top will become thick and sour, and to a considerable extent prevent the cream from rising, and thus occasion a corresponding loss in the amount of collected cream.

The object of my invention is to provide a simple and cheap apparatus for reducing the temperature of milk, whereby the difficulty of keeping the upper portion of the milk cool and sweet will be obviated, the quantity of raised cream increased, and the operation of collecting the same facilitated; and the invention therein consists in the peculiar construction, arrangement, and combination of the novel component parts of my apparatus, all as more fully hereinafter explained.

In order that those skilled in the art may know how to make and use my invention, I will proceed to fully describe the same, having reference to the accompanying drawings, in which—

Figure 1:
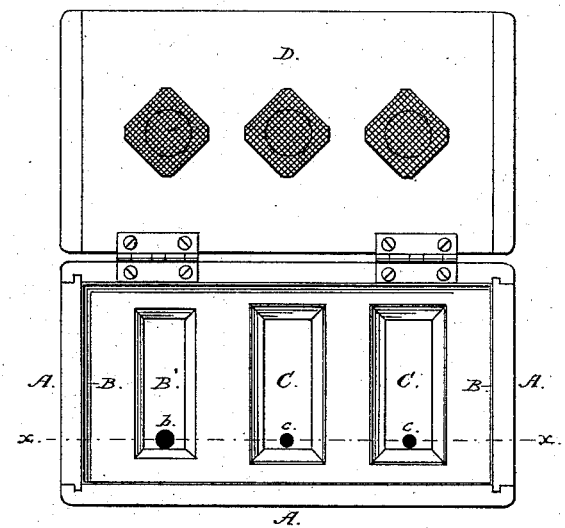
Figure 2:
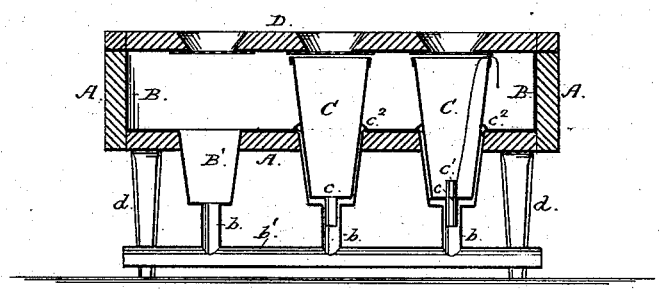
Figure 3:
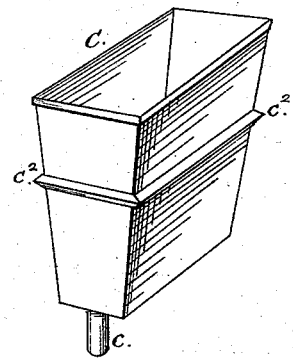

Figure 1 is a plan view of one of my improved milk-coolers with one of the milk-receptacles removed; Fig. 2, a vertical longitudinal section of the same on the line $x \; x$ of Fig. 1; and Fig. 3, a view, in detail, of one of the milk-receptacles.

In the drawings, A represents the frame of a milk-cooler, preferably of wood and of rectangular form. Into the inside of this frame is fitted a metal tank, B, provided with one or more chambers, B', of rectangular shape and with slightly downwardly-tapering sides, that extend for some distance below the bottom of the frame A, through suitable apertures made therein. These chambers, at their bottoms, are connected by small pipes or ducts $b$ with a pipe, $b'$, arranged below said chambers and lying nearly in a vertical plane with the ends thereof. From this description it will be readily seen that the tank and its chambers are perfectly water-tight except where they communicate with pipe $b'$, which is open at both ends.

The milk-receptacle, which is lettered C, is of rectangular form, and has slightly downwardly-tapering sides, and is provided at its bottom with a small tube or pipe, $c$, supplied with a suitable stopper, $c'$. This receptacle is intended to fit closely into chamber B', with its pipe $c$ also closely fitting into pipe $b$; and in order to keep its lower surface from contact with the bottom of the chamber, and at the same time afford a support, the receptacle has a projection or rib, $c''$, passing around its sides, so that about one-half said receptacle is incased within the chamber, while the remaining part occupies its relative position with the others in the tank. The receptacle C fits its corresponding chamber water-tight, the projection $c''$ extending over and pressing upon the sides of said chamber in such a manner as to prevent the entrance of water therein. The milk-receptacles are arranged within the tank, so as to have a free and open space around that portion of their sides above the projections or ribs $c''$, and their tops, which are open, should be nearly flush with its top.

The frame A has a hinged cover, D, in which are ventilators supplied with wire-cloth to exclude flies and dust, the frame being supported on legs $d$. This frame may be of any suitable size, and the number of milk-receptacles and their corresponding chambers may either be increased or diminished, as circumstances require.

In carrying my invention into effect, I place the milk-receptacles into their corresponding chambers, close the pipe leading from the bottom of each with the stopper provided for that purpose, and then fill them with the milk from which the cream is to be collected. I then fill the tank with water nearly even with the tops of the receptacles, and close the cover of the frame. The water surrounding the milk-receptacles in the tank will in a short time change the upper portion of the milk to its own temperature, and then, by its increase in specific gravity, the milk at the top will settle to the bottom of said receptacles and its place be filled by the warm milk ascending and carrying the globules of cream with it to the upper surface. The milk will be continually agitated in this manner till an even temperature, or nearly so, is obtained throughout its depth, and all the cream obtained therefrom and collected on the surface, where it may be removed in the usual manner. The milk is then removed from the receptacles by withdrawing the stopper with which each is provided and allowing it to pass off through pipe $b'$. As soon as the milk is withdrawn the water is readily removed from the tank by taking out one of the receptacles and letting the water pass off through the same pipe $b'$. By cooling the milk in this way there is no chance for its upper portion to become thick and sour, and the warm milk, in being brought to the surface, carries the globules of cream with it, and thus facilitates its collection there; and when the milk becomes of the same temperature throughout its entire depth the cream will have been nearly all brought to the surface, while the milk underneath is changed so as to become a very little sour.

What I claim is—

1. An apparatus for cooling milk provided with one or more removable milk-receptacles, of rectangular form, with slightly downwardly-tapering sides, and having a projecting rib passing around said sides about midway their height, substantially as described and shown, as and for the purposes set forth.

2. An apparatus for cooling milk provided with a water-tank having one or more rectangular chambers, with slightly downwardly-tapering sides extending below its bottom, with pipes leading therefrom into a general waste-pipe arranged below and lying in nearly a vertical plane with the ends of said chambers, substantially as described and shown, as and for the purpose specified.

3. An apparatus for cooling milk provided with a water-tank having one or more chambers extending below said tank, as described, and one or more removable milk-receptacles, with their lower half adapted to fit said chambers water-tight, while the upper half of said receptacles have a free open space around their sides, substantially as described and shown, as and for the purposes set forth.

4. In an apparatus for cooling milk, in combination with the tank B, provided with one or more chambers, B′, pipes $b$, and pipe $b'$, the milk-receptacles C, provided with pipes $c$, stoppers $c'$, and ribs $c''$, and adapted to fit such chambers water-tight, substantially as described and shown.

This specification signed and witnessed this 25th day of August, A. D. 1880.

CORNELIUS D. ELDER.

Witnesses:
 H. BRAYTON,
 GEO. W. DUNHAM.